United States Patent [19]
McEntire et al.

[11] Patent Number: 5,781,946
[45] Date of Patent: Jul. 21, 1998

[54] ATTACHABLE BLANKET/SEAT COVER FOR PORTABLE INFANT CAR SEAT OR APPARATUS

[76] Inventors: Wanda M. McEntire, 736 N. 1060 E., St. George, Utah 84770; Vera Lindsey Wilson, 98 S. 2200 W., Layton, Utah 84041

[21] Appl. No.: 831,367

[22] Filed: Apr. 1, 1997

[51] Int. Cl.$^6$ .................................................. A47G 9/06
[52] U.S. Cl. .......................... 5/482; 5/494; 5/416; 2/69
[58] Field of Search ........................... 5/482, 494, 416; 2/69, 69.5

[56] References Cited

U.S. PATENT DOCUMENTS

| | | | |
|---|---|---|---|
| 3,165,358 | 1/1965 | Card | 297/389 |
| 3,366,294 | 1/1968 | Stephenson | 224/29 |
| 4,047,755 | 9/1977 | McDonald et al. | 297/216 |
| 4,172,300 | 10/1979 | Miller | 2/69.5 |
| 4,173,048 | 11/1979 | Varaney | 5/436 |
| 4,274,674 | 6/1981 | Deloustal | 297/250 |
| 4,383,712 | 5/1983 | Kaganas | 297/219 |
| 4,383,713 | 5/1983 | Roston | 297/219 |
| 4,434,513 | 3/1984 | Welch | 2/410 |
| 4,441,221 | 4/1984 | Enste et al. | 5/431 |
| 4,897,885 | 2/1990 | Lunt | 2/69.5 |
| 4,979,250 | 12/1990 | Troncone et al. | 5/494 |
| 4,993,090 | 2/1991 | Ranalli | 5/494 X |
| 5,056,533 | 10/1991 | Solano | 128/845 |
| 5,058,226 | 10/1991 | Crosby | 5/494 |
| 5,189,748 | 3/1993 | Garrison et al. | 5/655 |
| 5,243,724 | 9/1993 | Barnes | 5/494 X |

*Primary Examiner*—Michael F. Trettel

[57] ABSTRACT

A novel blanket/seat cover (7) for portable infant car seat or apparatus comprising of a flat cross-shaped member (8) having a mid section area (9), a right side extension (10), a left side extension (11), a lower extension (12) and an upper extension (13) each extension having a fold line (24) common to said mid section area (9) allowing each extension to be folded, a strap (14) located on each side of said mid section area (9), a leg pocket member (15) having an attachment means to said flat cross-shaped member (8) with upper edge unattached, a slit (20) at center of said leg pocket member (15), a central opening (16) to accommodate shoulder-body strap locking devise, a storage pocket member (17) having an attachment means to said flat cross-shaped member (8) with lower edge unattached, a storage pocket closure member (19) having an attachment means to said flat cross-shaped member (8) with upper edge and both sides unattached of said storage pocket closure member (19) having an attachment means for storage pocket (18) allowing said storage closure member (19) to engage and disengage with said storage pocket member (17), a filler (21) is used when a double layer of said flat cross-shaped member (8) is employed, no filler (21) if single layer, said flat cross-shaped member (8) having a edging (22) typical at all edges with an attachment means for edging (23).

3 Claims, 4 Drawing Sheets

ATTACHABLE BLANKET/SEAT COVER FOR PORTABLE INFANT CAR SEAT OR APPARATUS

BACKGROUND

1. Field of Invention

This invention relates in general to an infant blanket/seat cover, specifically to such infant blanket/seat cover which is used for comfort and wrapping an infant in before or at the same time placing such infant in an infant car seat or in an infant apparatus used to hold an infant in a safe manner while in transit by automobile, baby stroller or any other type of apparatus used as a means to transport an infant from place to place.

2. Description of Prior Art

Prior art blankets used for wrapping up infant before placing the infant into an infant car seat are blankets for covering the infant only. The prior art is not used as a cover for the infant car seat and at the same time used to wrap the infant up as an infant blanket. The prior art blankets are not as versatile and are limited to their use. They are used only as infant blankets and are not used as an infant seat cover at the same time. The prior art has a separate cover for the infant car seat and a separate blanket used to wrap up the infant.

Most infant car seats are made of hard material which makes the surface hard causing the need for an infant car seat cover made of a soft material for the comfort of the infant. This makes extra cost for a separate seat cover for the infant car seat. My invention is an infant blanket and at the same time an infant seat covering making it a two-in-one application. With my invention there is no extra cost for a separate soft seat cover.

Another type having an infant application is the infant side support sleeper which is a restraining device adapted to support an infant lying on its side. This prior art cannot be used as an infant blanket/seat cover.

Another type having an infant application is the support cushion which is used as a seat cushion only. This prior art cannot be used as an infant blanket/seat cover.

Another type having a child application is the child support wedge which is used as a gymnastic and support wedge for multiple and severely handicapped children of kindergarten and school age. This prior art cannot be used as an infant blanket/seat cover.

Another type having an infant application is the infant head protector which is designed to surround the head of an infant. This prior art cannot be used as an infant blanket/seat cover.

Another type having an infant application is the orthopedic support apparatus for infants made up of a flat back member having a top and a bottom edge and two side edges with a pillow removable positioned near the top edge. The top edge has two straps for securing the infant to the flat back member. This prior art cannot be used as an infant blanket/seat cover.

Another type having a seat cover application is the composite seat cover which is used to cover a regular car seat. This seat cover cannot be used with an infant car seat. This prior art cannot be used as an infant blanket/seat cover.

Another type having an infant application is the safety seat for transporting a child in a motor vehicle. This is a reclinable safety seat for supporting and holding a child, designed to be placed in an automobile by means of two straps. This prior art is only a safety seat. It is not an infant blanket/seat cover.

Another type having an older child or an adult application is the pillow configuration which is not for infants. It is used as a pillow for comfortably encircling substantially the entire body of an older child or an adult. This prior art cannot be used as an infant blanket/seat cover.

Another type having an infant application is the restraining means for an infant car seat. It has a frame; a hoop pivotally mounted on the frame; a seat pivotally mounted on the frame; and at least one apertured bracket mounted on the seat, the bracket having a plurality of spaced apart positioning slots for selectively receiving the hoop. This prior art is a specific restraining means for an infant car seat. It cannot be used as an infant blanket/seat cover.

Another type having an infant application is the safety carrier for infants which is a portable self-contained safety carrier for infants. It is adopted for carrying infants in the arms of an adult or in a vehicle. This prior art cannot be used as an infant blanket/seat cover.

Another type having an infant application is the infant-holding attachment for seats which is used to hold infants in a seat. This prior art cannot be used as an infant blanket/seat cover.

OBJECTS AND ADVANTAGES

Accordingly, besides the objects and advantages described above, several objects and advantages of the present invention are:

(a) to provide a one piece infant blanket/seat cover which has several purposes: (1) to cover the hard surface of the infant car seat with a soft material for the comfort of the infant and (2) used as an infant blanket to wrap-up the infant before or after being placed in the infant car seat.

(b) to provide an opening for the holding straps of the infant car seat or infant apparatus, such as a baby stroller and etc. This opening in the infant blanket/seat cover allows the holding straps of the car seat to be received by the locking means of the infant car seat after the infant blanket/seat cover is placed in the infant seat with or without the infant in the infant blanket/seat cover. This is one of the novel features of this invention.

(c) to provide the infant car seat the ability to be removed from the car with the infant still wrapped-up in the infant blanket/seat cover. The infant need not be removed from the infant car seat to be wrapped-up in an infant blanket. My invention becomes part of the car seat as an infant blanket/seat cover.

(d) to provide a storage area for a second blanket. This second blanket can be removed from its storage area and used to drop over the infant car seat or infant apparatus to protect and/or shade the infant from the wind or sun. When the second infant blanket is not needed, it can be neatly tucked back inside of the storage pocket area, which is part of the infant blanket/seat cover of the upper extension of the infant blanket/seat cover. The storage pocket area for the second infant blanket is folded over and in a downward direction at the upper edge of the infant car seat or infant apparatus located just above the infant's head. However, this storage pocket can be located anywhere in the infant blanket/seat cover.

(e) to provide a novel way of comforting and at the same time covering an infant in an infant car seat. The prior art means of keeping an infant warm and shaded consists of bundling an infant in a blanket and trying to bring the seat belt down over this bulky mass, which causes the infant to be uncomfortable and at the same time the straps on the infant car seat are constrained and many times the adjustable strap clip cannot be brought up to the chest area because of the bulk mass and sometimes the straps fall off of the shoulders of the infant in a snowsuit or a heavy coat create a problem because the suits or coats are heavy and awkward making it hard to get the infant's arms and legs into the snowsuit or heavy coat, especially when the infant is fussy or asleep. The prior art consist of a bulky blanket being carried separate from the infant car seat used to cover the infant up to protect and/or shade the infant from the elements of the weather.

It is an object of the present invention to provide an infant blanket/seat cover comprising of a blanket and seat cover which is placed in the infant car seat whereby it becomes part of the infant car seat as a seat cover having sufficient length, width and sufficient openings to allow the infant car seat holding means for the infant to pass through to the locking device on the infant car seat or infant apparatus. The infant can be in or out of the blanket/seat cover before placing the infant blanket/seat cover in the infant car seat or infant apparatus. No prior art has combined these two features of a one-piece blanket/seat cover that can be attached by sufficient means to the infant car seat or infant apparatus as a seat cover and at the same time an infant blanket.

Other objects and features are readily apparent from the following description of certain preferred embodiments thereof taken in conjunction with the accompanying drawings, although variations and modifications may be affected without departing from the sphere and scope of the normal concepts of the disclosed invention. You will find further objects and advantages of the invention from a consideration of the ensuing descriptions and accompanying drawings.

DRAWING FIGURES

Figure 1:
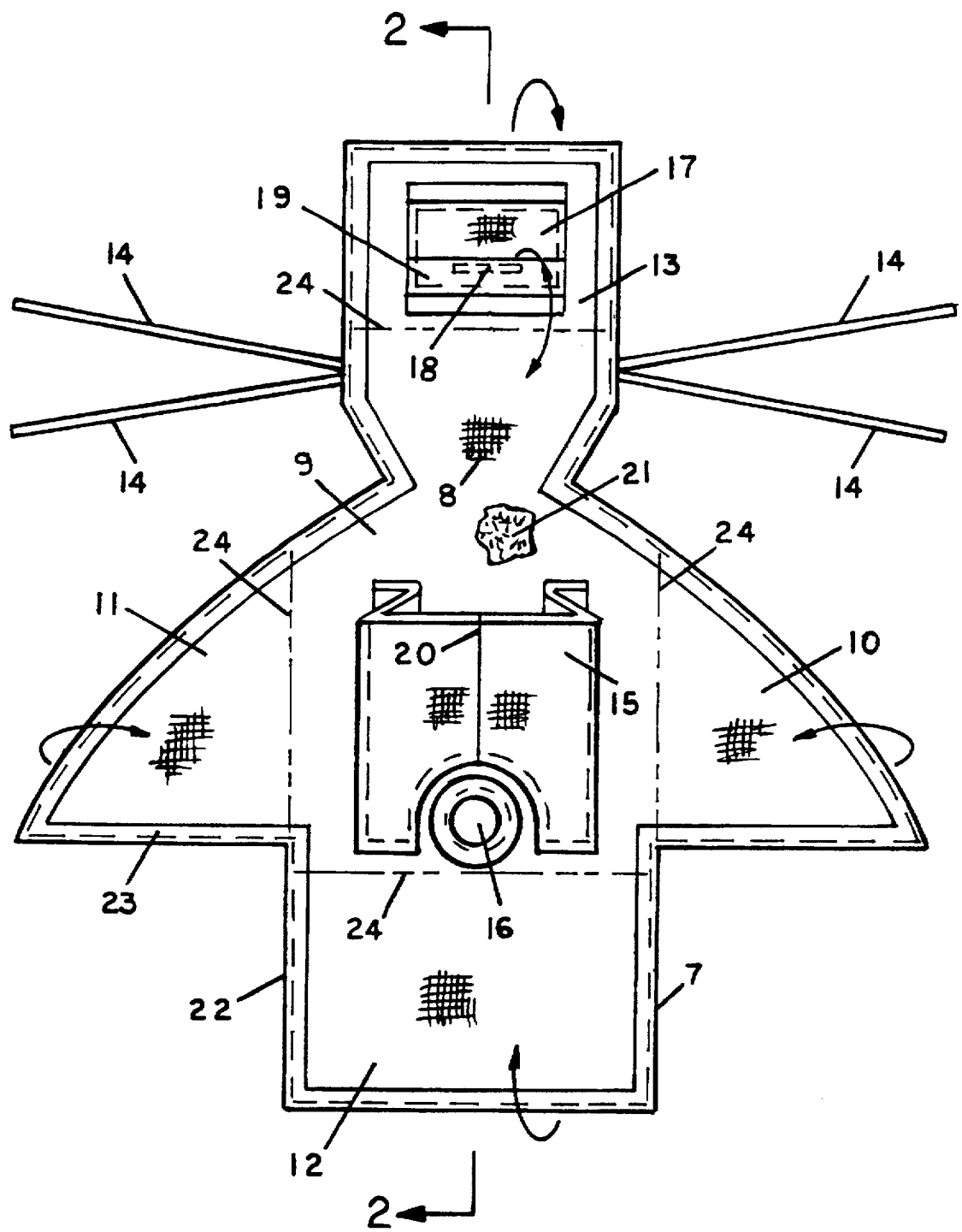
FIG. 1 Shows a top view of the attachable blanket/seat cover in the unfolded position.

| Drawing Reference Numerals |
| --- |
| 7 blanket/seat cover |
| 8 flat cross-shaped member |
| 9 mid section area |
| 10 right side extension |
| 11 left side extension |
| 12 lower extension |

| -continued |
| --- |
| Drawing Reference Numerals |
| 13 upper extension |
| 14 strap |
| 15 leg pocket member |
| 16 central opening |
| 17 storage pocket member |
| 18 attachment means for storage pocket |
| 19 storage pocket closure member |
| 20 slit |
| 21 filler |
| 22 edging |
| 23 attachment means for edging |
| 24 fold line |

DESCRIPTION OF INVENTION

Figure 2:
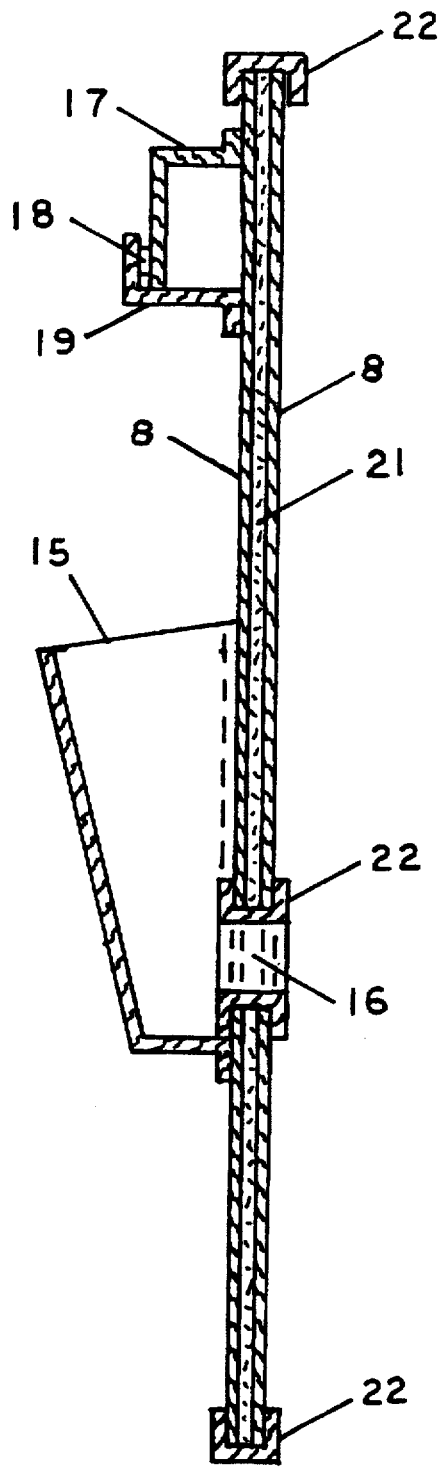
FIG. 2 Shows a cross-sectional view of the attachable blanket/seat cover taken along the line 2-2 FIG. 1.
Figure 4:
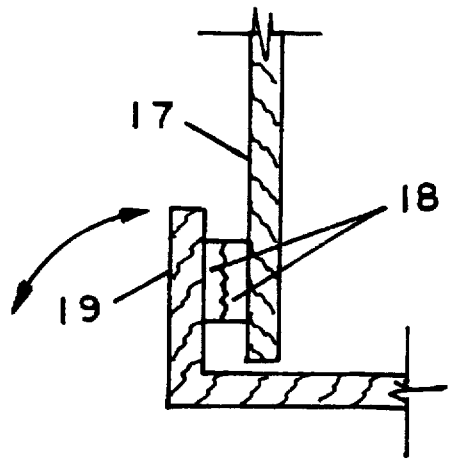
FIG. 4 Shows a blown-up cross-sectional view of the attachment means for the storage pocket member and storage pocket closure member.
Figure 3:
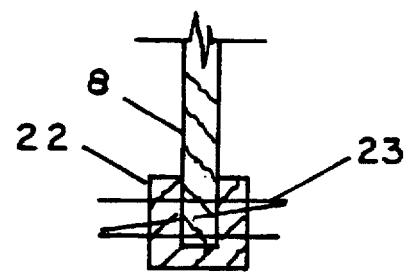
FIG. 3 Shows a blown-up cross-sectional view defining an alternate method using a single thickness with edging and an attachment means.
Figure 5:
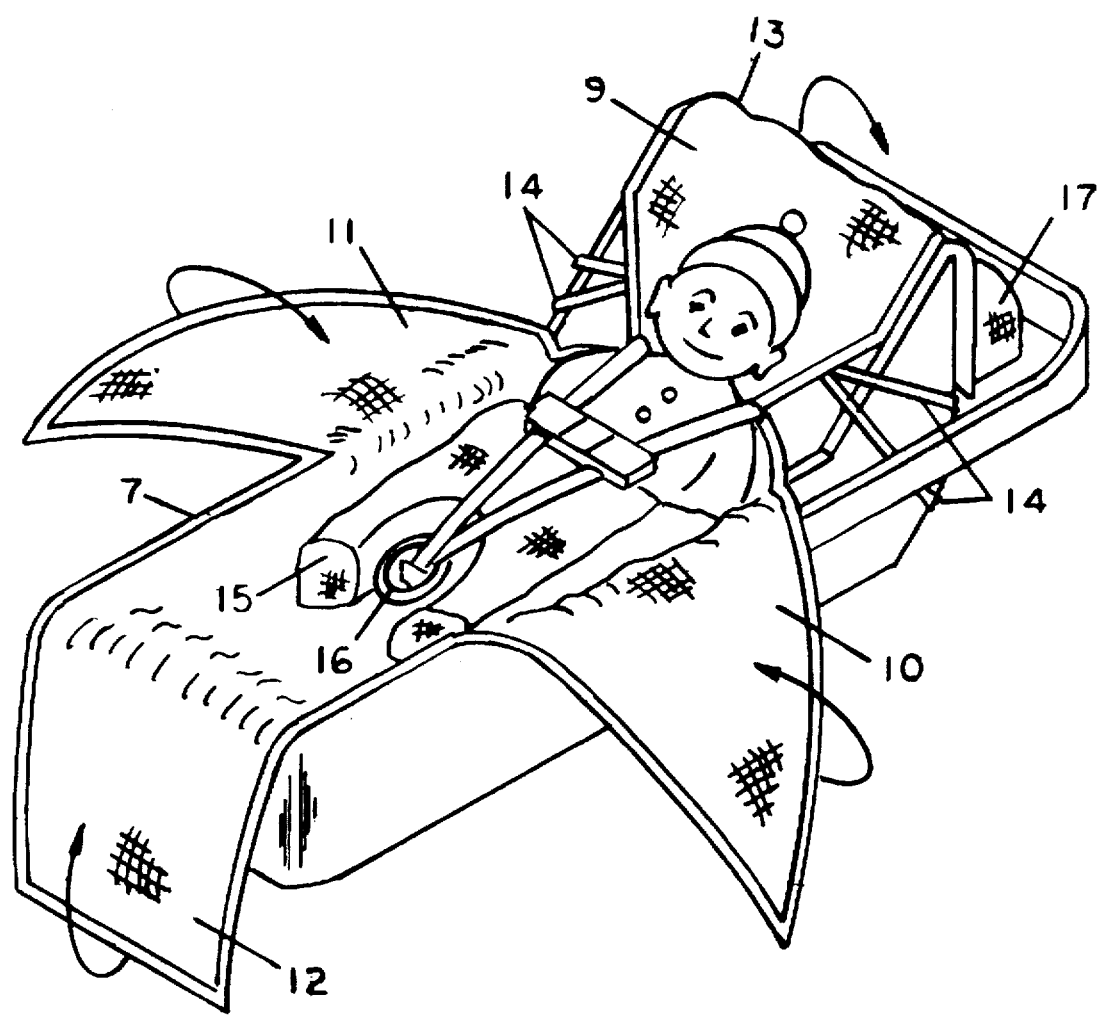
FIG. 5 Shows a perspective view of the attachable blanket/seat cover in the unfolded position in accordance with the invention.
Figure 6:
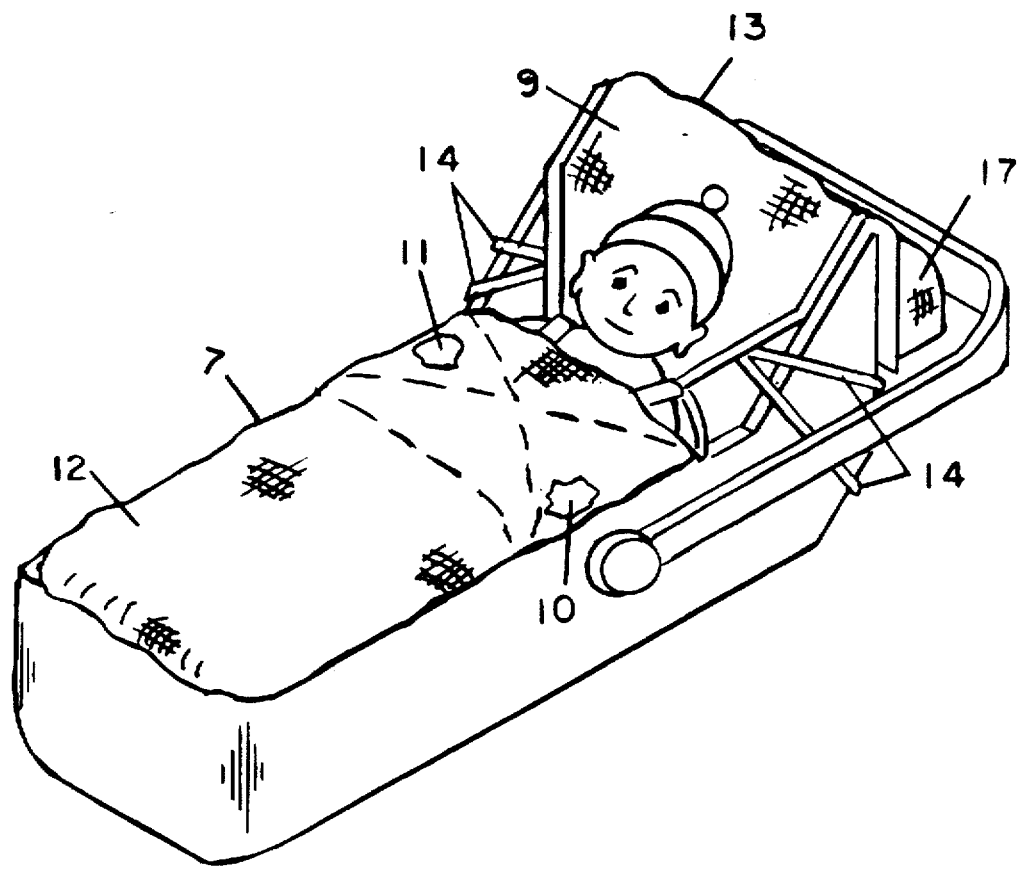
FIG. 6 Shows a perspective view of the attachable blanket/seat cover in the folded position in accordance with the invention.

The attachable blanket/seat cover for portable infant car seat or infant apparatus shown in FIG. 1, FIG. 2, FIG. 3, FIG. 4, FIG. 5 and FIG. 6 comprises of a sufficient shape shown in FIG. 1, having sufficient thickness, width and length, having the following features: flat cross-shaped member 8, having a double layer with a filler 21 between the top flat cross-shaped member 8 and the bottom flat cross-shaped member 8 as shown in FIG. 2, or a single layer flat cross-shaped member 8 with no filler 21 as shown in FIG. 3, the flat cross-shaped member 8, having a mid section area 9 this area accommodates the infants body, having a right side extension 10 to be folded at the fold line 24 in a left direction, as shown in FIG. 1, having a left side extension 11 to be folded at the fold line 24 in a right direction as shown in FIG. 1, having a lower extension 12 to be folded at the fold line 24 in an upward direction as shown in FIG. I and FIG. 5 having an upper extension 13 to be folded at the fold line 24 in a downward direction over the upper part of the infant car seat or apparatus as shown in FIG. 1, FIG. 5 and FIG. 6. These above-stated parts of the blanket/seat cover all having sufficient width and length to accommodate the sufficient shape of the flat cross-shaped member 8 in accordance with the invention as shown in FIG. 1.

The flat cross-shaped member 8, having sufficient number of straps 14 to allow the flat cross-shaped member 8 to be attached to the infant car seat or apparatus. Strap 14 is attached to the flat cross-shaped member 8 by an attachment means for edging 23 at the edging 22 area, located at two different locations, one where the right side extension 10, and the upper extension 13 converge, and one where the left side extension 11 and the upper extension 13 converge. The edging 22 is typical at all edges of the flat cross-shaped member 8. Strap 14 may be button-on, press-on, hook-on or any type of an attachment means. These attachment means may be located in various locations on the flat cross-shaped member 8 at the edging 22 area.

There is a central opening 16 in the flat cross-shaped member 8 to accommodate the infant car seat shoulder-body straps locking device as shown in FIG. 1 and FIG. 2.

Attached by an attachment means to the flat cross-shaped member 8, a leg pocket member 15 which accommodates the legs of the infant, having an attachment means for storage pocket 18, having a slit 20 at the center of the leg pocket member 15 as shown in FIG. 1. Said slit 20 allows the leg pocket member 15 to split in the middle allowing better access when placing the infants legs into the leg pocket member 15. However, the leg pocket member 15 may be in one piece without an attachment means at said slit 20 or the leg pocket member 15 may be in multiple pieces with the needed number of attachment means to accommodate the leg pocket member 15.

Attached by an attachment means to the flat cross-shaped member 8 a storage pocket member 17, having a storage pocket closure member 19, with an attachment means for storage pocket 18 as shown in FIG. 2 and FIG. 4. This storage pocket member 17 and storage pocket closure member 19 accommodates a second folded-up infant blanket. Said storage pocket member 19 and storage pocket closure member 17 may be located in various locations on the flat cross-shaped member 8, but the most practical location is just above the infants head located in the upper extension 13 as shown in FIG. 1, FIG. 2, FIG. 5 and FIG. 6.

CONCLUSION AND SCOPE OF INVENTION

Accordingly, the reader will see that the attachable blanket/seat cover for portable infant car seat or apparatus of this invention has the ability to comfort and cover an infant. The blanket/seat cover has the ability to be a combination blanket and seat cover for an infant car seat. Furthermore, the blanket/seat cover has the additional advantages in that:

- it provides the ability to allow the infant to be placed in the infant car seat while being in the blanket/seat cover.
- it permits the blanket/seat cover to be attachable to the infant car seat so as to become part of the infant car seat as a seat cover.
- it allows the shoulder-body straps of the infant car seat to be received by its locking device by passing through the central opening in the blanket/seat cover with the infant in the blanket/seat cover.
- it allows the disengagement of the locking device for the shoulder-body straps without removing the blanket/seat cover from the infant car seat.
- it provides compactness allowing the blanket/seat cover to be a small configuration.
- it provides quick infant removal from the infant car seat or apparatus.
- it provides the infant comfort because the blanket/seat covers the hard material of some infant car seats.
- it allows the infant more freedom since the infant does not need to be placed in a snowsuit or a bulky coat before being placed in the infant car seat.
- it provides the infant with a second infant blanket that is stored in the storage pocket that is part of the blanket/seat cover.
- it provides the infants legs protection from the cold because of the leg pocket that is part of the blanket seat cover. However, the infant may be placed on top of the leg pocket and not in the leg pocket if desired.
- it allows the blanket/seat cover to be folded-up around the body, legs and arms of the infant, thereby, all parts of the infants body kept warm without the use of a snowsuit and/or bulky coat.

Although the description above contains many specifications, these should not be construed as limiting the scope of the invention but merely provide illustrations of some of the presently preferred embodiments of this invention. For example, the blanket/seat cover or mid section extensions whether, right, left, lower or upper as well as the leg pocket, storage pocket, central opening or straps can have other shapes such as square, oval, trapezoidal, triangular, etc. The folding and attachment means of the blanket/seat cover can be of different combinations.

Thus, the scope of the invention should be determined by the appended claims and their legal equivalents, rather than by the examples given.

I claim as my intention:

1. An attached blanket/seat cover for portable infant car seat or apparatus which comprises:
   a flat cross-shaped member, having a mid section area which has a right side extension, a left side extension, a lower extension and an upper extension, said mid section area separates said right side extension and said left side extension, said mid section area having a common fold line with said right side extension, said fold line allows said right side extension to fold up over said mid section area, said mid section area having a common fold line with said left side extension, said fold line allows said left side extension to fold up over said mid section area, said mid section area separates said lower extension and said upper extension, said mid section area having a common fold line with said lower extension, said fold line allows said lower extension to fold up over said mid section area, said mid section area having a common fold line with said upper extension, said fold line allows said upper extension to fold down-over an upper area of said portable infant car seat or apparatus, said flat cross-shaped member having an edging that gives support and strength to all edges of said flat cross-shaped member, said flat cross-shaped member having a central opening located on a centerline of said mid section area, said central opening allows a safety strap of said portable infant car seat or apparatus to pass through said central opening for attachment of said safety strap to said portable infant car seat or apparatus, a pair of straps having an attached end and an unattached end, said attached end of each said strap having a means for attachment of each said strap to said flat cross-shaped member at two spaced locations, the first location is where said right side extension and said upper extension converge, the second location is where said left side extension and said upper extension converge, said unattached end of said straps being used to attach said flat cross-shaped member to said portable infant car seat or apparatus.

2. The attachable blanket/seat cover for portable infant car seat or apparatus, as recited in claim 2, further comprising:
   a left pocket member having a right edge, a left edge, a lower edge and an upper edge, said leg pocket member centered on a centerline of said flat cross-shaped member located at said mid section area, said lower edge having an arch cut-out area which accommodates said central opening in said mid section area at a common centerline of said leg pocket member and said flat cross-shaped member, said top edge is unattached to said flat cross-shaped member at said mid section area, said leg pocket member centered on said flat cross-shaped member at said mid section area, and said lower edge of said leg pocket member from said fold line that is common to said mid section area and said lower extension, said leg pocket member having a slit running along said centerline from the top edge of said leg pocket member to an edge of said arch cut-out area of said pocket member, said slit having an attachment means to attach said slit together at said centerline, said right edge, said left edge and said lower edge including the arch edge of said arch cut-out area of said leg pocket member having an attachment means for attaching said right edge, said left edge and said lower edge including said arch edge of said arch cut-out area of said leg pocket member to said flat cross-shaped member at said mid section area.

3. The attachable blanket/seat cover for portable infant car seat or apparatus, as recited in claim 2, further comprising:

a storage pocket member having a right edge, a left edge, a lower edge and an upper edge, said storage pocket member located near the upper edge of said upper extension of said flat cross-shaped member, said lower edge being unattached to said upper extension, said right edge, said left edge and said upper edge being attached to said flat cross-shaped member, a storage pocket closure member being attached to said flat cross-shaped member at said upper extension to close said storage pocket member.

* * * * *